United States Patent [19]

Paik et al.

[11] Patent Number: 5,484,878
[45] Date of Patent: Jan. 16, 1996

[54] PROCESS FOR PREPARING POLYSUCCINIMIDES FROM ASPARTIC ACID

[75] Inventors: Yi H. Paik, Princeton, N.J.; Ethan S. Simon, Ambler; Graham Swift, Blue Bell, both of Pa.

[73] Assignee: Rohm and Haas Company, Philadelphia, Pa.

[21] Appl. No.: 296,337

[22] Filed: Aug. 25, 1994

Related U.S. Application Data

[62] Division of Ser. No. 911,866, Jul. 10, 1992, Pat. No. 5,380,817.

[51] Int. Cl.$^6$ .................................................. C08G 69/10
[52] U.S. Cl. ................ 528/328; 528/322; 528/361; 528/363; 528/480; 528/488; 525/419; 525/420; 525/539
[58] Field of Search .................................. 528/328, 361, 528/363, 480, 322, 488; 525/419, 420, 539

[56] References Cited

U.S. PATENT DOCUMENTS

| | | |
|---|---|---|
| 2,306,918 | 12/1942 | Weiss et al. . |
| 3,052,655 | 9/1962 | Fox et al. . |
| 3,474,083 | 10/1969 | Shiga et al. . |
| 3,846,380 | 11/1974 | Fujimoto et al. . |
| 3,923,751 | 12/1975 | Iwashita et al. . |
| 4,590,260 | 5/1986 | Harada et al. . |
| 4,839,461 | 6/1989 | Boehmke . |
| 5,057,597 | 10/1991 | Koskan . |
| 5,219,952 | 6/1993 | Koskan et al. . |
| 5,296,578 | 3/1994 | Koskan et al. . |
| 5,319,145 | 6/1994 | Paik et al. ............................. 528/328 |
| 5,371,177 | 12/1994 | Paik et al. ............................. 528/361 |
| 5,371,179 | 12/1994 | Paik et al. ............................. 528/363 |
| 5,380,817 | 1/1995 | Paik et al. ............................. 528/328 |
| 5,393,868 | 2/1995 | Freeman et al. ....................... 528/480 |

FOREIGN PATENT DOCUMENTS

| | | |
|---|---|---|
| 44-9394 | 4/1969 | Japan . |
| 52-8873 | 3/1977 | Japan . |

*Primary Examiner*—P. Hampton-Hightower
*Attorney, Agent, or Firm*—Kimberly R. Hild

[57] ABSTRACT

A process is provided for preparing polysuccinimides by forming a polymerization mixture of poly(alkylene glycol), aspartic acid and, optionally, one or more other amino acids; heating the mixture to an elevated temperature; and maintaining the mixture at the elevated temperature to form polysuccinimides.

13 Claims, No Drawings

PROCESS FOR PREPARING POLYSUCCINIMIDES FROM ASPARTIC ACID

This is a divisional of application Ser. No. 911,866, filed Jul. 10, 1992, now U.S. Pat. No. 5,380,817, granted Jun. 13, 1994.

FIELD OF THE INVENTION

This invention relates to a process for preparing polysuccinimides. In particular, the present invention relates to a process for preparing polysuccinimides from aspartic acid, and optionally other amino acids, in poly(alkylene glycol).

BACKGROUND OF THE INVENTION

Several methods are known for obtaining polysuccinimide, which when hydrolyzed to form the corresponding poly(amino acid) is useful as an absorbent, hard-surface cleaner, water-treatment additive for boiler waters and cooling towers and as a detergent additive acting as a builder, anti-filming agent, dispersant, sequestering agent and encrustation inhibitor. However, all of the previously known methods for preparing polysuccinimide suffer from the drawbacks of excessively long process times, expensive starting materials, or require the handling of solid materials which poses many difficulties in a manufacturing environment.

U.S. Pat. No. 5,057,597 to Koskan discloses a solid-phase process for preparing polysuccinimide by fluidizing an amino acid with agitation in a nitrogen atmosphere at a temperature of at least 180° C. for three to six hours. The resultant polysuccinimide is then hydrolyzed to form a poly(amino acid).

U.S. Pat. No. 4,839,461 to Boehmke, et al. discloses a process for preparing poly(aspartic acid) by combining maleic acid or maleic anhydride and an ammonia solution in a molar ratio of 1:1–1.5. The mixture is then heated to 120°–150° C. and the resulting solution of ammonium salt and maleic acid is evaporated, leaving a crystal mash. The crystal mash is then melted, during which time the waters of condensation and crystallization distill off. A porous mass of poly(aspartic acid) results. The entire process requires six to eight hours to complete.

Japanese Patent 52-0088773 B assigned to Ajinomoto, discloses a solvent-based process for the preparing poly(aspartic acid). The process described therein utilizes a hydrohalic acid salt of aspartic acid anhydride in one or more organic solvents. The solvents disclosed are organic acids such as propionic acid, butyric acid, and valeric acid; alcohols such as tert-butyl alcohol and tert-amyl alcohol, esters such as ethyl acetate and butyl acetate; ketones such as methyl isobutyl ketone and cyclohexanol; ethers such as tetrahydrofuran and dioxane; halogenated hydrocarbons such as ethylene dichloride and dichlorobenzene; hydrocarbons such as toluene, xylene and decalin; and amides such as dimethylformamide. These solvents may impart additional hazards, expense, odor, toxicity and removal steps to obtain the final product.

The prior art methods for the synthesis of polysuccinimides and poly(amino acids) are time consuming, complex or use large volumes of volatile organic solvents or inert gases. As used hereinafter and in the appended claims, "polysuccinimides" refers to polymeric materials which contain succinimide moieties in the polymer chain and may contain other moieties, and "polysuccinimide" refers to polymeric materials which contain only such moieties.

It is an object of the present invention to provide a solvent process for producing polysuccinimides.

It is a further object of the present invention to provide a solvent process for producing polysuccinimides which does not require a product separation step.

SUMMARY OF THE INVENTION

The present invention provides a process for preparing polysuccinimides by:

a) forming a polymerization mixture of poly(alkylene glycol), aspartic acid and, optionally, one or more other amino acids;

b) heating the mixture to an elevated temperature; and c) maintaining the mixture at the elevated temperature to form polysuccinimides.

DETAILED DESCRIPTION OF THE INVENTION

The poly(alkylene glycols) useful in the present invention are those which are fluid at the reaction temperature. Suitable poly(alkylene glycols) include poly(tetramethylene glycol), poly(ethylene glycol), and poly(propylene glycol). The poly(alkylene glycol) can also be terminated at one or both ends by carboxylic acids, alkyl groups of from 1 to 30 carbon atoms, or amines, or alkylamines of from 1 to 10 carbon atoms, or any combination thereof. Preferably the poly(alkylene glycol) is diethylene glycol, poly(ethylene glycol), methyl-terminated poly(ethylene glycol), or poly(propylene glycol). The molecular weight of the poly(alkylene glycol) is up to about 30,000, preferably from about 300 to about 20,000, and most preferably from about 1,000 to about 15,000. The poly(alkylene glycol) is added to the polymerization mixture at a level of from 2 to about 90 percent by weight relative to the aspartic acid, preferably from about 20 to about 90, and most preferably from about 30 to about 85 percent by weight relative to the aspartic acid.

In addition to aspartic acid, polysuccinimides can be made by the process of the present invention with up to 80 percent by weight (based on the weight of aspartic acid) of one or more other amino acids. Preferred other amino acids are alanine, lysine, asparagine, glycine and glutamic acid. When used, it is preferred that the one or more other amino acid are present at a level of from 5 to about 70 percent, and most preferably from about 10 to about 60 percent by weight based on the weight of aspartic acid.

The atmosphere of the polymerization is preferably substantially free of oxygen, including the oxygen present in air. An atmosphere substantially free of oxygen is preferred since, at the temperatures needed for the polycondensation reaction to occur, the poly(alkylene glycols) will oxidize, discolor or degrade. Suitable means for achieving an atmosphere substantially free of oxygen is by blanketing, sweeping or bubbling the reactor with an inert gas, preferably nitrogen, or conducting the polymerization at reduced pressure.

The elevated temperature for the process of the present invention must be high enough to provide polycondensation. The preferred temperature will vary with the operating conditions. For example, the preferred temperature may increase as the ratio of aspartic acid to poly(alkylene glycol) increases, or as the pressure at which the polycondensation is conducted increases. However, the preferred temperature may decrease, for example, in the presence of azeotropic solvents. In general, the preferred elevated temperature is from about 120° to about 300° C.

The polysuccinimides are formed by a condensation reaction. It is therefore desirable to remove the by-products, such as water or alcohol, which are liberated in order to drive the reaction toward completion. Suitable means of removing water include addition of one or more azeotropic solvents to the polymerization mixture such as toluene, xylene, or tetralin, and removing the azeotropic distillate from the polymerization mixture. Another means of removing the water is by adding to the polymerization mixture one or more drying agents such as aluminosilicates. Another means of removing the water is by bubbling an inert gas through the polymerization mixture, or sweeping an inert gas over the surface of the polymerization mixture. Another means of removing the water is by conducting the polymerization under reduced pressure.

The polymerization can be conducted as a batch or continuous process. Suitable reactors include batch tank reactors, continuous stirred tank reactors, plug-flow reactors, pipe reactors and scraped-wall reactors. The temperature of the reaction must be sufficient to drive off the water which is liberated in the condensation reaction. This temperature will vary according to whether an azeotropic solvent is employed and the pressure at which the polymerization is conducted which can be subatmospheric, atmospheric or supraatmospheric.

The products which result from the process of the present invention are solutions, suspensions or dispersions of polysuccinimides in poly(alkylene glycol). Poly(alkylene glycols) are useful in many of the applications for the poly(succinimides) such as, for example, in detergent formulations. Thus, there is no need for a separation step to isolate the poly(succinimides) from the poly(alkylene glycol) when the product is used in a detergent application. If desired, the poly(succinimides) can be hydrolyzed by any conventional means to form the corresponding poly(amino acids), such as poly(aspartic acid). A preferred means of hydrolysis is by contacting the product with an aqueous alkaline solution such as sodium hydroxide or sodium carbonate.

EXAMPLE 1

Preparation of Poly(succinimide)

To a 100 milliliter three-neck round bottom flask equipped with a magnetic stirring bar, Dewar condenser, and an inlet and outlet for nitrogen was added 5.0 grams of L-aspartic acid and 5.0 grams of poly(ethylene glycol), methyl ether having a molecular weight of 350. The flask was continuously swept with nitrogen and immersed in an oil bath maintained at 200° C. for 15 hours then cooled to room temperature. Analysis by $^1$H NMR spectroscopy indicated that no aspartic acid remained. The polysuccinimide was hydrolzed with dilute aqueous sodium carbonate to form poly(aspartic acid). Analysis by $^1$H NMR spectroscopy confirmed that poly(aspartic acid) was formed.

We claim:

1. A process for preparing polysuccinimides comprising:
   a) forming a polymerization mixture of poly(alkylene glycol), aspartic acid and, optionally, one or more other amino acids;
   b) heating the mixture to an elevated temperature of from about 120° C. to about 300° C.;
   c) maintaining the mixture at the elevated temperature to form polysuccinimides; and
   d) hydrolyzing the polysuccinimides to form the corresponding poly(amino acid).

2. The process of claim 1, wherein the poly(alkylene glycol) is selected from the group consisting of poly(tetramethylene glycol), poly(ethylene glycol), poly(propylene glycol); and poly(tetramethylene glycol), poly(ethylene glycol), poly(propylene glycol) which are terminated at one or both ends by carboxylic acids, alkyl groups of from 1 to 30 carbon atoms, amines, alkylamines of from 1 to 10 carbon atoms, and combinations thereof.

3. The process of claim 1, wherein the poly(alkylene glycol) is selected from the group consisting of diethylene glycol, poly(ethylene glycol), methyl-terminated poly(ethylene glycol), and poly(propylene glycol).

4. The process of claim 1, wherein the poly(alkylene glycol) is poly(ethylene glycol).

5. The process of claim 1, wherein the polymerization mixture contains poly(alkylene glycol) at a level of from 2 to about 90 percent by weight relative to the aspartic acid.

6. The process of claim 1, wherein the polymerization mixture contains poly(alkylene glycol) at a level of from about 20 to about 90 percent by weight relative to the aspartic acid.

7. The process of claim 1, wherein the polymerization mixture contains poly(alkylene glycol) at a level of from about 30 to about 85 percent by weight relative to the aspartic acid.

8. The process of claim 1, wherein the one or more other amino acids are selected from the group consisting of alanine, glycine, lysine, asparagine, and glutamic acid.

9. The process of claim 1, wherein the one or more other amino acids is alanine.

10. The process of claim 1, wherein the polymerization mixture contains one or more amino acids at a level of up to 80 percent by weight based on the aspartic acid.

11. The process of claim 1, wherein the polymerization mixture contains one or more amino acids at a level of from about 5 to about 70 percent by weight based on the aspartic acid.

12. The process of claim 1, wherein the polymerization mixture contains one or more amino acids at a level of from about 10 to about 60 percent by weight based on the aspartic acid.

13. The process of claim 1 wherein the mixture is maintained at the elevated temperature in an atmosphere substantially free of oxygen.

* * * * *